US010050901B2

(12) United States Patent
Krishnamurthy et al.

(10) Patent No.: US 10,050,901 B2
(45) Date of Patent: Aug. 14, 2018

(54) EFFICIENT MANAGEMENT AND CONFIGURATION OF IN-BAND RESOURCES

(71) Applicant: Cisco Technology, Inc., San Jose, CA (US)

(72) Inventors: Raghu Krishnamurthy, Santa Clara, CA (US); Manikantan Venkiteswaran, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 263 days.

(21) Appl. No.: 14/258,901

(22) Filed: Apr. 22, 2014

(65) Prior Publication Data

US 2015/0304233 A1    Oct. 22, 2015

(51) Int. Cl.
*H04L 12/923* (2013.01)
*G06F 9/44* (2018.01)
(Continued)

(52) U.S. Cl.
CPC .......... *H04L 47/762* (2013.01); *G06F 9/4401* (2013.01); *G06F 9/4416* (2013.01); *H04L 41/0816* (2013.01)

(58) Field of Classification Search
CPC ...... G06F 9/4401; G06F 11/2028; G06F 8/61; G06F 1/3234; G06F 1/3296;
(Continued)

(56) References Cited

U.S. PATENT DOCUMENTS 8,458,499 B2    6/2013    Brey et al.
8,631,150 B2    1/2014    Krithivas
(Continued)

FOREIGN PATENT DOCUMENTS

WO    WO2015/164883    10/2015

OTHER PUBLICATIONS

PCT Sep. 8, 2015 International Search Report and Written Opinion from the International Searching Authority from the International Serial No. PCT/US2015/033259.
(Continued)

*Primary Examiner* — Thomas J Dailey
*Assistant Examiner* — Ruth Solomon
(74) *Attorney, Agent, or Firm* — Polsinelli PC

(57) ABSTRACT

There is disclosed herein, by way of example, an enterprise server computing platform configured to provide stateless computing, wherein each node has no set configuration, including for example, MAC addresses, UUIDs, firmware, and BIOS by way of non-limiting example. Certain devices or peripherals may be considered "out-of-band," meaning that they are discoverable and configurable in standby power by a baseboard management controller (BMC) without need for an OS. Certain other peripherals are considered "in-band," meaning that they may need an OS for discovery and configuration. According to one or more example embodiments of this Specification, a system and method are disclosed for automatically discovering and configuring out-of-band devices on a server. Out-of-band devices may then be disabled, and the server is booted with minimal resources and a bootstrap OS to discover and configure in-band devices.

20 Claims, 5 Drawing Sheets

(51) Int. Cl.
*H04L 12/24* (2006.01)
*G06F 9/4401* (2018.01)

(58) Field of Classification Search
CPC .... G06F 9/4416; G06F 9/4403; G06F 9/4408; H04L 41/0806; H04L 63/102; H04L 41/04; H04L 47/70
USPC ........ 713/100, 300, 323, 324, 330; 709/219, 709/223, 224
See application file for complete search history.

(56) References Cited

U.S. PATENT DOCUMENTS

| | | | |
|---|---|---|---|
| 2004/0181800 A1 | 9/2004 | Rakib et al. | |
| 2004/0181811 A1 | 9/2004 | Rakib | |
| 2005/0216627 A1 | 9/2005 | Goud et al. | |
| 2008/0288764 A1* | 11/2008 | Lu | G06F 9/4405 713/2 |
| 2011/0213954 A1* | 9/2011 | Baik | G06F 9/4418 713/2 |
| 2011/0283006 A1* | 11/2011 | Ramamurthy | H04L 41/00 709/228 |
| 2012/0158928 A1 | 6/2012 | Naddeo | |
| 2013/0080754 A1* | 3/2013 | Ganesh | G06F 9/4403 713/2 |
| 2013/0091260 A1 | 4/2013 | Murphy et al. | |
| 2014/0101653 A1* | 4/2014 | Dharmadhikari | G06F 8/65 717/173 |
| 2014/0208133 A1* | 7/2014 | Gopal | G06F 11/2294 713/310 |
| 2014/0280790 A1* | 9/2014 | Maddukuri | H04L 41/24 709/220 |
| 2014/0359044 A1* | 12/2014 | Davis | H04L 45/60 709/213 |
| 2015/0081829 A1* | 3/2015 | Maity | H04L 41/082 709/212 |
| 2015/0154029 A1* | 6/2015 | Lu | G06F 8/654 713/2 |
| 2015/0156212 A1* | 6/2015 | Khatri | H04L 63/1425 726/23 |
| 2015/0248315 A1* | 9/2015 | Ragupathi | H04L 12/6418 709/226 |

OTHER PUBLICATIONS

PCT Nov. 3, 2016 International Preliminary Report on Patentability from International Application Serial No. PCT/US2015/033259.

* cited by examiner

EFFICIENT MANAGEMENT AND CONFIGURATION OF IN-BAND RESOURCES

FIELD OF THE DISCLOSURE

This application relates to the field of virtual computing, and more particularly to a system and method for efficient management and configuration of in-band resources.

BACKGROUND

The unified computing system (UCS) is an x86-based data center platform useful for providing, for example, large-scale data and hosting services. In certain embodiments, a UCS may include one or more blade servers, one or more rack servers, or a combination of blade and rack servers. Both the rack form factor and the blade form factor provide industry-standard connectors and interfaces, enabling a UCS to conform to open protocols and to use third-party hardware and software. In certain embodiments, a UCS may be provided with a plurality of servers, each of which may host a hypervisor such as a VMware ESX, ESXi, a Microsoft Hyper-V, a Citrix Zen server, or similar. In other embodiments, a server may be provided with a host operating system (OS), and may provide other virtual machines, such as a VMware workstation.

It will be recognized that in accordance with industry practice, a hypervisor may be provided in one of at least two configurations. A type I hypervisor runs directly on a server's hardware, and manages guest OSs directly without the need of a host OS.

Examples of type I hypervisor's include the aforementioned VMware ESX and ESXi, Microsoft Hyper-V, and Citrix XenServer.

A type II hypervisor includes a host OS running on the hardware, which then provides hypervisor management software. Examples of type II hypervisors include VMware workstation and virtual box hypervisors. It is also possible to provide certain hybrid hypervisor that are not strictly type I or type II, for example, a kernel-based virtual machine (KVM).

In certain circumstances, it is desirable for a server providing hypervisor functionality to have certain configurable resources rather than fixed and immutable attributes. Thus, one useful function of a UCS is to provide configurable attributes for servers, and thus provide increased flexibility to clients operating hypervisors on the UCS.

Because UCS is an open architecture, it may be compatible with off-the-shelf and legacy solutions. Available resources on a server may be usefully divided into two categories. Out-of-band resources are directly configurable by the UCS, without the need for a host OS running on the server. In-band resources are resources that, for example, may not be UCS-aware because they are legacy or off-the-shelf solutions, and therefore are not directly configurable by an out-of-band management. In that case, in-band resources may need to be configured by an OS.

BRIEF DESCRIPTION OF THE DRAWINGS

The present disclosure is best understood from the following detailed description when read with the accompanying FIGURES. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
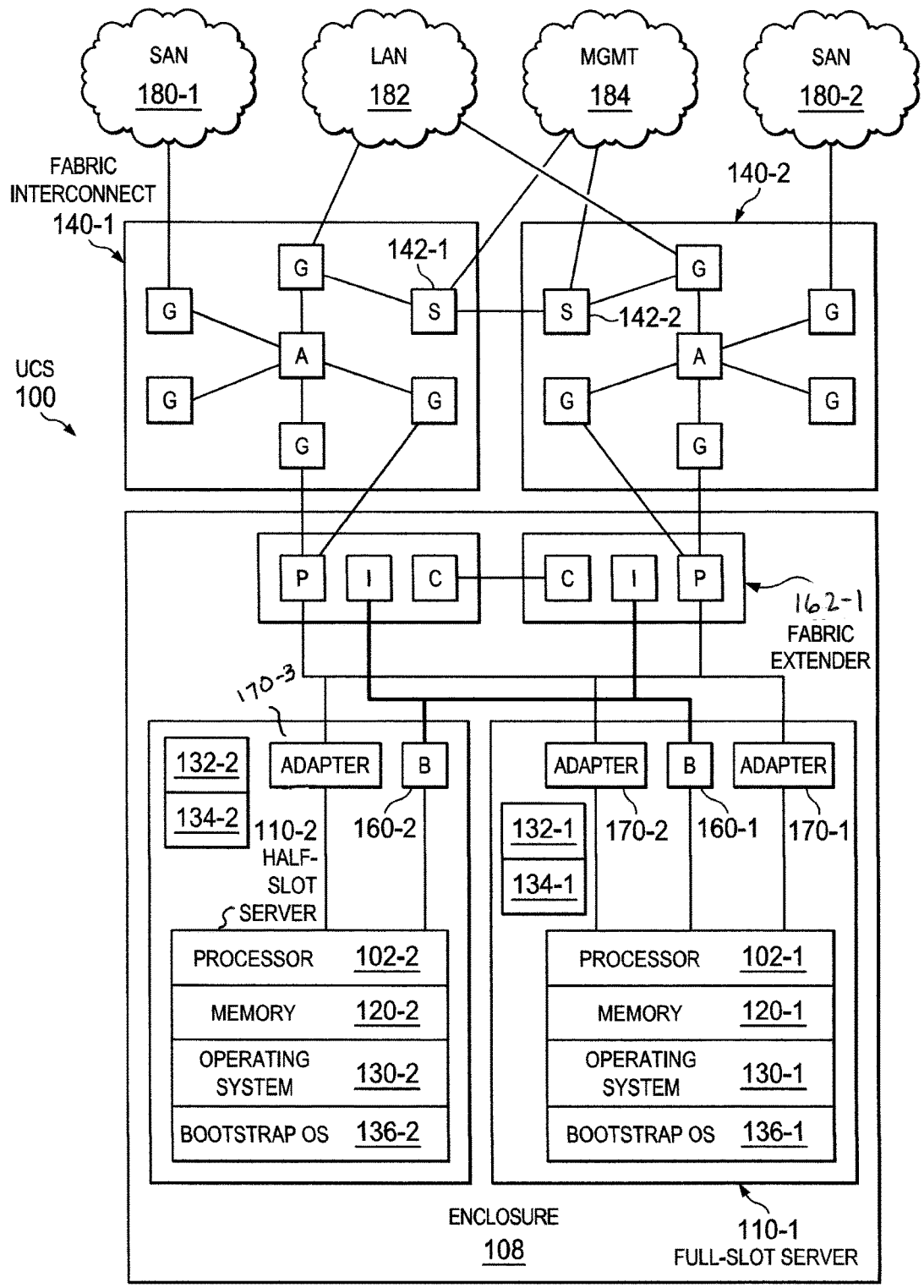
FIG. 1 is a block diagram of a UCS according to one or more examples of the present Specification.

There is disclosed herein, by way of example, an enterprise server computing platform such as Cisco's® Unified Computing System (UCS), configured to provide stateless computing, wherein each node has no set configuration, including for example, media access control (MAC) addresses, universally-unique identifiers (UUIDs), firmware, and basic input/output system (BIOS) settings by way of non-limiting example. Certain devices or peripherals may be considered "out-of-band," meaning that they are discoverable and configurable in standby power by a baseboard management controller (BMC) without need for an OS. Certain other peripherals are considered "in-band," meaning that they may need an OS for discovery and configuration. According to one or more example embodiments of this Specification, a system and method are disclosed for automatically discovering and configuring out-of-band devices on a server. Out-of-band devices may then be disabled, and the server is booted with minimal resources and a bootstrap OS to discover and configure in-band devices.

EXAMPLE EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiment may have different advantages, and no particular advantage is necessarily required of any embodiment.

An important benefit of UCS as disclosed in this Specification is so-called "stateless computing." Stateless computing means that each node within the UCS, such as a server, need not have a fixed or immutable configuration. Rather, many attributes of the node can be persistently configured, and the node can then be operated as though those persistent attributes were immutable attributes of a standalone system. For example, a standalone system may have a fixed and immutable media access control (MAC) address for a network interface card (NIC). The MAC address may be, for example, provided by a read-only memory (ROM) or other memory that is not user configurable. In contrast, a node on a UCS may have a user configurable MAC address. Thus, a UCS client can specify a desired MAC address, and the NIC on that UCS node may be configured with that MAC address.

If the NIC is specifically designed to be UCS-capable and aware, then configuration of the NIC may be accomplished by out-of-band management. This means that a UCS manager device (UCSM) may access a baseboard management controller (BMC) resident on the node, and the BMC may autonomously configure the NIC with the desired MAC address. On the other hand, if the NIC is an off-the-shelf or legacy NIC that is not UCS-aware and capable, configuration of the MAC address may not be accomplished via the BMC or out-of-band management. In that case, an OS running on the UCS node may be required to configure a desired MAC address on the NIC. This situation is referred to as in-band management.

Nonlimiting examples of attributes that may be configured by a UCS, either in-band or out-of-band, include the following: For storage devices, worldwide port name (WWPN) or worldwide node name (WWNN) of the server computer, virtual storage area networks (VSANs) with which the server computer is associated, any adapter policy specifying error handling and timing settings, and configurations of the local storage drive of the server computer.

Configurable hardware attributes may include, by way of nonlimiting example, a universally unique identifier (UUID) of the server computer, basic input/output system (BIOS) settings, firmware levels/versions of the server computer, and boot policies.

Network attributes that may be configurable include, by way of nonlimiting example, the MAC address of the server computer, the NIC firmware (e.g., associated with the network interface) of the server computer, the quality of service (QoS) assigned to the server computer, and the virtual local area networks (VLANs) switch to which the server computer is assigned or associated.

Operational attributes that may be configurable include, by way of nonlimiting example, data indicating external management access, firmware bundles and management of the server computer, health policy of the server computer, and an activation attribute that indicates whether the service profile is active or inactive.

FIG. 1 is a block diagram of UCS 100 according to one or more examples of the present Specification. In an example, UCS 100 includes an enclosure 108, a fabric interconnect 140, and a plurality of cloud services including a storage area network (SAN) 180, a local area network 182, and management services 184.

Enclosure 108 may be configured as a rackmount system, a blade system, or any other suitable enclosure type. To facilitate discussion, enclosure 108 will be treated herein as a blade chassis. Enclosure 108 may include a number of slots to receive UCS nodes such as servers 110. It should be noted that a server is not the only type of possible UCS node, and that other types of UCS nodes are available. For example, certain UCS nodes may be provisioned for use as storage appliances, security appliances, or other useful types of appliances.

In this example, enclosure 108 includes two servers 110. Specifically, server 110-1 is a full-slot server, while server 110-2 is a half-slot server. It should be recognized that many other types of servers are possible, and that in certain embodiments, not all servers 110 need to be necessarily provided with an enclosure 108. In some embodiments, a server 110 may be a standalone device that is communicatively coupled to enclosure 108 or to fabric interconnect 140.

It should also be noted that various types of interconnections and buses will be disclosed within this Specification. As used throughout this Specification, a "bus" or "interconnect" includes any wired or wireless interconnection line, network, connection, bundle, single bus, multiple buses, crossbar network, single-stage network, multistage network or other conduction medium operable to carry data between parts of a computing device, or between computing devices. It should be noted that these uses are disclosed by way of non-limiting example only, and that some embodiments may omit one or more of the foregoing buses, while others may employ additional or different buses.

Full-slot server 110-1 includes two NIC adapters 170, specifically adapter 170-1 and adapter 170-2. NIC adapters 170 are provided to communicatively couple full-slot server 110-1 to other network elements. Half-slot server 110-2 may include an adapter 170-3.

Full-slot server 110-1 also includes a BMC 160-1. BMC 160-1 is provided to perform management and configuration functions, especially for out-of-band management operation. It should be noted that BMC 160 is disclosed by way of a specific example, and that certain BMCs 160 provide management and configuration services that are specific to a Cisco® implementation of UCS. It is not intended, however, that BMC 160 is restricted specifically to the Cisco® BMC. Rather, BMC 160 may include any hardware, software, firmware, or combination thereof configured to provide configuration and management services of UCS resources and without the need of a dedicated OS or other similar resident program.

In particular, it is intended that BMC 160-1 perform configuration and management services while server 110 is in a low-power state, such as a standby state. In contrast, OS 130, or bootstrap OS 136 may require full-slot server 110 to be in a relatively high power state. It should also be noted that "low-power" and "high-power" are provided simply as relative terms to one another. In general, a low-power state may include a state where server 110 is not completely powered on and does not provide all or substantially all of its full functionality, whereas the high-power state is a state where server 110 is powered on and provides all or substantially all of its capabilities, less capabilities that are specifically disabled for purposes of management and configuration as disclosed herein.

Full-slot server 110-1 also includes a processor 102-1 that is configured to communicatively couple to other system elements via one or more interconnects or buses. Processor 102-1 includes any combination of hardware, software, or firmware providing programmable logic, including by way of non-limiting example a microprocessor, DSP, FPGA, PLA, ASIC, or virtual machine processor.

Processor 102-1 is communicatively coupled to a memory 120-1, for example in a direct-memory access (DMA) configuration. Memory 120 is disclosed as a single logical block in this example, and may include any suitable volatile or non-volatile memory technology, including DDR RAM, SRAM, DRAM, flash, ROM, optical media, virtual memory regions, magnetic or tape memory, or any other suitable technology. In certain embodiments, memory 120 may be a relatively low-latency volatile main memory. It should also be noted that although DMA is disclosed by way of non-limiting example, DMA is not the only protocol consistent with this Specification, and that other memory architectures are available.

It should be noted that full-slot server 110-1 may also include a separate storage, such as a hard drive, optical media, or similar, separate from memory 120-1. For simplicity of discussion, memory 120-1 and storage are not shown as separate logical blocks in this configuration.

Memory 120-1 may be operable to load and execute both an OS 130-1 and a bootstrap OS 136-1. In certain embodiments, OS 130-1 and bootstrap OS 136-1 may not be configured to execute concurrently. Rather, bootstrap OS 136-1 may be configured to provide discovery, management, and configuration of resources, and in particular in-band resources, as disclosed herein. OS 130-1, in contrast, may be configured to provide more traditional OS services, and may be configured to take advantage of the full capability of full-slot server 110-1.

Full-slot server 110-1 may include both in-band resources 134-1 and out-of-band resources 132-1. Out-of-band resources 132 include those resources that are UCS-aware, or that are otherwise configurable without the need for bootstrap OS 136. Thus, UCS 100 can configure out-of-band resources 132-1, including the attributes described herein that may be desirably configured on behalf of an end user, without having to operate full-slot server 110-1 in a higher power configuration. Rather, out-of-band resources 132-1 may be discovered and persistently configured while keeping full-slot server 110-1 in a low-power mode, such as a standby mode.

Enclosure 108 may also include a half-slot server 110-2. It will be recognized that half-slot server 110-2 is in many respects similar to full-slot server 110-1, including the provision of a BMC 160-2, processor 102-2, memory 120-2, OS 130-2, bootstrap OS 136-2, in-band resources 134-2, and out-of-band resources 132-2. However, half-slot server 110-2 may include fewer overall resources then full-slot server 110-1. In particular, in some embodiments, half-slot server 110-2 may include fewer processors and fewer DIMMs, thus providing less processing power and memory.

Full-slot server 110-1 and half-slot server 110-2 are provided by way of example only. It is not intended to imply herein that enclosure 108 is required to have at least one full-slot server 110-1 or at least one half-slot server 110-2. Furthermore, enclosure 108 may include additional servers 110, which may be of any species. Thus, it should be appreciated that enclosure 108 may include a plurality of different types of UCS nodes in many different configurations.

It will also be recognized that enclosure 108 may also include blades or slots that are not servers 110 and that are not UCS specific devices. For example, enclosure 108 may include additional power supplies and support hardware that is not specific to UCS 100. In particular, enclosure 108 may also include one or more fabric extenders 162. In this particular embodiment, two fabric extenders 162-1 and 162-2 are shown. Fabric extenders 162 may be special UCS nodes that may occupy a blade or rack position within enclosure 108. In one embodiment, fabric extender 162-1 and fabric extender 162-2 may be operable to service different types of servers 110.

For example, fabric extender 162-1 may be configured and operable primarily to service full-slot servers 110-1, while fabric extender 162-2 may be configured and operable primarily to service half-slot server 110-2. In certain embodiments, the primary intelligence for performing UCS functions with an enclosure 108 is provided by fabric extenders 162. Thus, fabric extenders 162 may sit as an intermediary between servers 110 and a fabric interconnect 140. By way of example, fabric extender 162-1 may include adaptive firmware P, which may be operable to perform global NIC configuration and perform statistics and housekeeping. Fabric extender 162 may include a chassis manager C, which is configured to perform server discovery and sequencing, power management, temperature monitoring, and fan control looping. An interconnect infrastructure I may be included to provide a data routing interface. In certain embodiments, each of P, I, and C may be provided as ASICs or other fixed-logic device. Advantageously, ASICs provide increased processing speed and efficiency over certain programmable processing devices. It should be noted, however, that the specific features of fabric extender 162-1 are provided by way of example only, and are intended to be nonlimiting. It will be recognized that many additional configurations are possible for a fabric extender 162, and it is intended that they be included within the scope of this Specification.

Fabric extender 162 may communicatively couple enclosure 108 to a one or more fabric interconnects 140. In this example, two fabric interconnects 140-1 and 140-2 are provided. In an example, fabric interconnect 140-1 is configured and operable to communicate primarily with fabric extender 162-1. Fabric interconnect 140-2 is configured and operable primarily to communicate and work with fabric extender 162-2. However, it will be recognized that many other configurations are possible.

Notably, each fabric interconnect 140-1 includes a UCSM 142. UCSMs 142 may be operable to perform UCS configuration and control services within the context of UCS 100. Thus, the primary intelligence and top-level control of the overall UCS 100 is provided by UCSMs 142. UCSMs 142 include, for example, infrastructure management subsystems, transactional information model subsystems, and an application gateway subsystem that may be configured to interact with system components. In this example, UCSM 142-1 of fabric interconnect 140-1 is communicatively coupled to UCSM 142-2 of fabric interconnect 140-2. This provides, in one example, a completely redundant UCS fabric with two independent fabric interconnect paths.

Fabric interconnect may also include a plurality of application-specific integrated circuits (ASICs) G, A, and S, provided for data path connectivity In this example, each UCSM 142 is communicatively coupled to a G ASIC. UCSMs 142 may also be communicatively coupled to cloud services, such as management services 184. Fabric interconnect 140-1 and 140-2 may also be configured to connect to other cloud services. For example, fabric interconnect 140-1 may communicatively couple to SAN 180-1, while fabric connect fabric interconnect 140-2 may be communicatively coupled to SAN 180-2.

Furthermore, fabric interconnect 140-1 and 140-2 may both jointly connect to a local area network (LAN) 182. Thus, UCS 100 is operable to connect to a local network, and in appropriate instances may also be operable to connect to a broader network such as an Internet. It should be noted that LAN 182 and the Internet are provided by way of example only, and other types of networks are anticipated herein. As used herein, a network, including LAN 182, includes any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Figure 2:
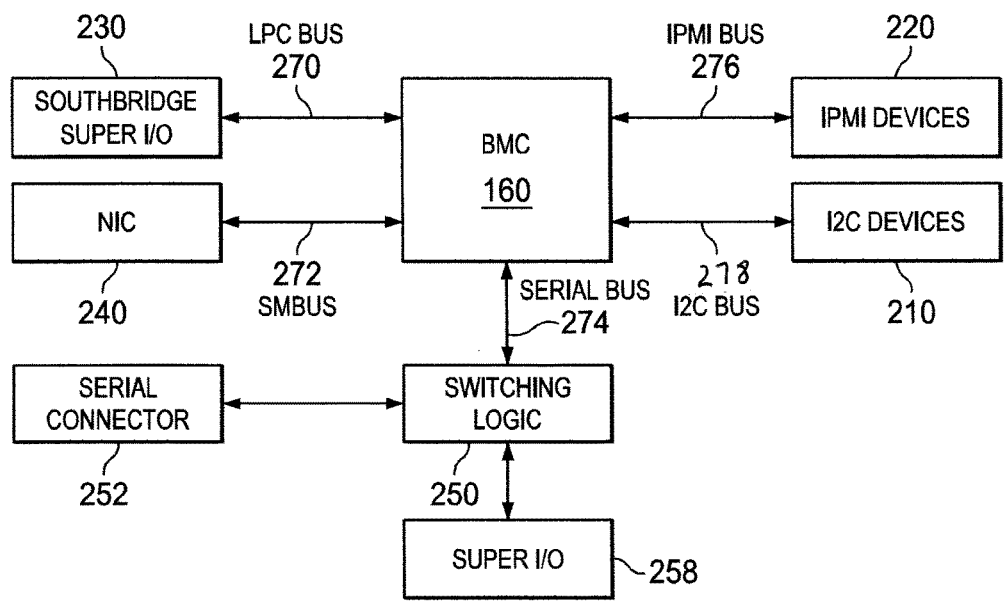
FIG. 2 is a block diagram of a BMC interacting with subsystems according to one or more examples of the present Specification.

FIG. 2 is a block diagram of an intelligent platform management interface (IPMI) according to one or more examples of the present Specification. It should be noted that IPMI 200 is based around BMC 160, which was disclosed in FIG. 1. IPMI 200 is provided not as a replacement for FIG. 1, but rather as an alternate view, in this case with focus on signal interchange and IPMI functions. Thus, the hardware blocks of IPMI 200 may, in certain embodiments, be realized within UCS 100. Those with skill in the art will recognize that there are many possible ways of integrating IPMI 200 into the disclosure of UCS 100.

IPMI is a standards-compliant system interface for computing platforms, and is useful, for example, in performing out-of-band management of computing systems such as UCS 100. IPMI 200 may be operated by a system administrator in configuring access to computing resources.

For example, a customer may contact a system administrator and request that a virtual machine or hypervisor be configured with specific resources. The end user may request that the hypervisor have a specific UUID and a specific MAC address. In cases where adapter 170 is a UCS-aware adapter, this may be accomplished via out-of-band management. For example, the system administrator may use a standardized interface and protocols to perform management within UCS 100, which management may include one or more servers 110. Advantageously, the IPMI system 200 of FIG. 2 may be operated independent of OS 130 and bootstrap OS 136. Thus, IPMI 200 may be accessed and operated while one or more servers 110 are in a low-power state, such as standby state. IPMI 200 may also advantageously be operated by a system administrator in the case that OS 130 fails or becomes unreachable. This enables the system administrator to perform management of a server 110 without the need of interfacing with a failed OS.

In an example, a system administrator uses IPMI messaging to perform tasks such as monitoring the status of server 110, including parameters such as temperature, voltage, fans, power supplies, and chassis intrusion detection; query inventory information; review logs and alert condition; and perform recovery procedures, including for example issuing requests for remote console access during system powered down and rebooting, or configuring watchdog timers. IPMI 200 may also include protocols for alerting the system administrator of special conditions.

In an example, IPMI 200 comprises a BMC 160. BMC 160 may also be communicatively coupled, for example, to a Southbridge Super I/O 230, an adaptor 170, switching logic 250, and inter-integrated circuit (I2C) 210. IPMI intelligence is provided by BMC 160. In certain embodiments, other controllers may be distributed among various subsystems of server 110, within enclosure 108, or throughout UCS 100. These other management controllers are treated herein as being logically connected to BMC 160, but it will be recognized, by those with skill in the art, that devices may be distributed in any suitable fashion, and that in some embodiments BMC 160 may include more than one piece of physical hardware.

A system administrator may manage BMC 160 with the remote management control protocol (RMCP). In certain embodiments, where BMC 160 is to be managed over LAN 182 or over the Internet, an enhanced version of RMCP called RMCP+, which includes stronger authentication, may be used. BMC 160 may include a specialized microcontroller, or other processor embedded within BMC 160, which itself may be embedded, for example, within a motherboard of server 110.

Physical interconnects to BMC 160 may include, by way of nonlimiting example, a low-pin count (LPC) bus 270, system management bus (SMBUS) 272, a serial bus 274, an I2C bus 278, and IPMI bus 276. In an example, each of these buses forms an interface to a class of connected devices. For example, IPMI bus 276 communicatively couples BMC 160 to IPMI devices 220. I2C bus 278 communicatively couples BMC 160 to I2C devices 210. LPC bus 270 communicatively couples BMC 160 to a Southbridge Super I/O subsystem 230. SMBUS 272 communicatively couples BMC 160 to a network interface card (NIC) 240. Serial bus 274 communicatively couples BMC 160 to switching logic 250, which is in turn communicatively coupled to a serial connector 252, which may be, for example, an RS-232, RS 422, Ethernet, FireWire, USB, or other suitable serial port, and to a super I/O 258.

In various embodiments, any or all of the peripheral devices described in FIG. 2 may be either an in-band resource 134, or an out-of-band resource 132.

For example, in one embodiment, LPC bus 270, and serial bus 274 may be legacy interfaces that are compatible only with legacy devices that are not suitable for out of band management. On the other hand, IPMI bus 276, I2C bus 278, and SMBUS 272 may all be more modern interfaces that are suitable for out-of-band management by BMC 160. Thus, during provisioning of server 110, BMC 116 may appropriately provision NIC 240 and I2C devices 210. IPMI devices 220 may be used in the provisioning step to provide data to BMC 160. In other cases IPMI devices 220 may also need to be provisioned. Once BMC 160 has properly provisioned NIC 240, IPMI devices 220, and I2C devices 210, out-of-band management is complete.

Server 110 may then disable IPMI bus 276, I2C bus 278, and SMBUS 272. In may then boot to bootstrap operating system 136, with only minimal processor 102 and memory 120 resources. Server 110 is then ready for provisioning of in-band resources 134. Upon booting, bootstrap OS 136 may discover the buses that are still enabled, namely LPC bus 270, and serial bus 274. Bootstrap OS 136 may then query LPC bus 270 and serial bus 274 for attached devices. Bootstrap OS 136 may therefore discover Southbridge super I/O 230, switching logic 250, super I/O 258, and serial connector 252. Finally, bootstrap OS 136 may perform in band management of these resources and provision them as necessary. Upon completion of this step, server 110 may be properly configured and ready for use by an end user, and may be powered down, upon which persistent configuration of both in-band and out-of-band resources is maintained.

Figure 3:
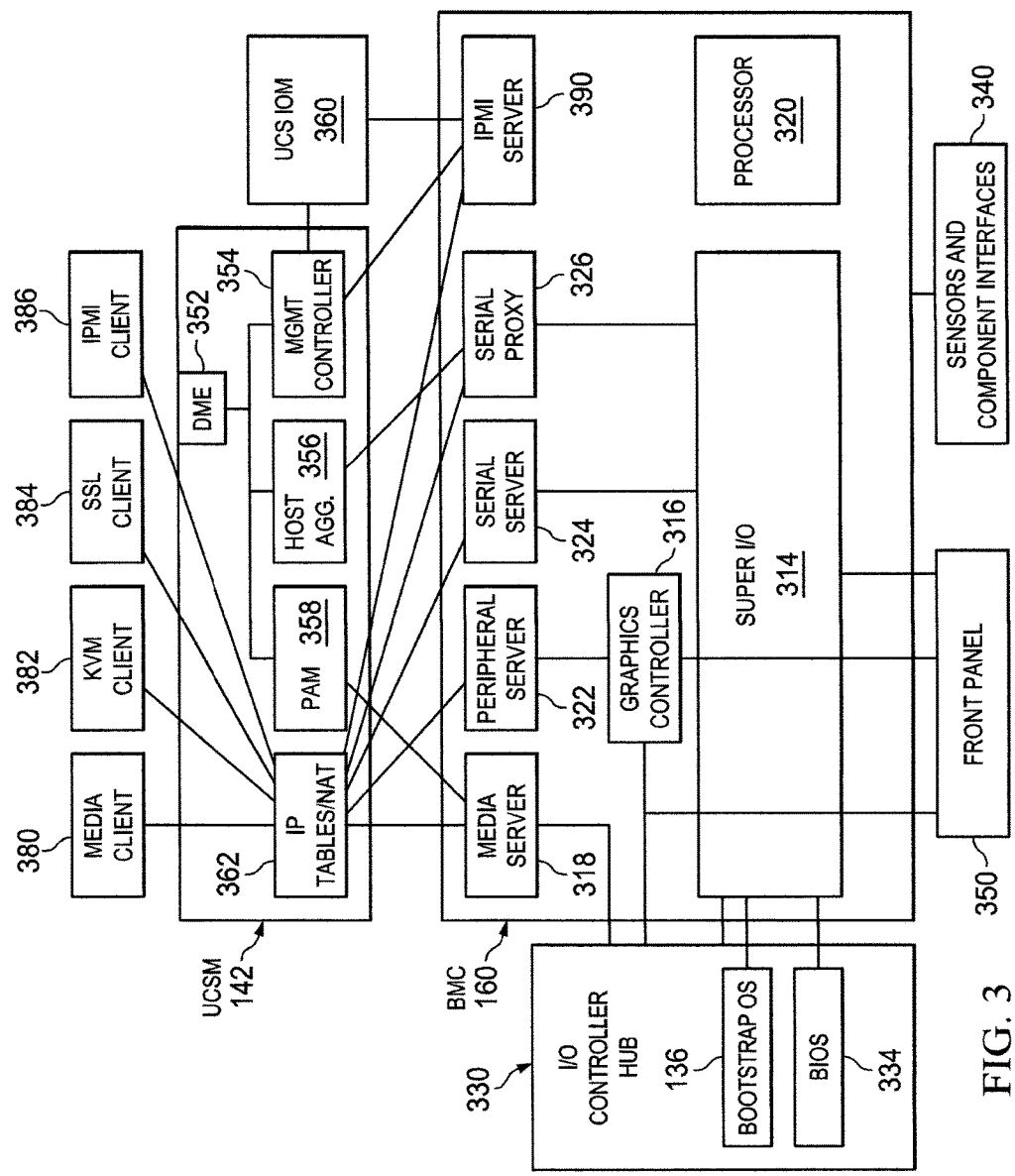
FIG. 3 is a block diagram of a BMC according to one or more examples of the present Specification.

FIG. 3 is a functional block diagram of select elements of a server 110 according to one or more examples of the present Specification. In this example, server 110 includes BMC 160, which may be communicatively coupled to an I/O controller hub 330. BMC 160 may also be communicatively coupled to UCSM 142. UCSM 142 is communicatively coupled to various client devices. These include a media client 380, a keyboard-video-mouse (KVM) client 382, a secure socket layer (SSL) client 384, and an IPMI client 386.

I/O controller hub 330 may be a subassembly of server 110, and in this embodiment includes a basic input/output system (BIOS) 334, and bootstrap OS 136.

UCSM 142 includes a number of logical blocks, such as a DME 352, an IP tables/network address translation (NAT)

module 362, a pluggable authentication module (PAM) 358, a host aggregator 356, and a management controller 354. UCSM 142 is also communicatively coupled to a UCS I/O module 360, which may be provided to manage input and output services for UCSM 142. The functions of IP tables/ NAT module 362, PAM 358, host aggregator 356, and DME 352 are all well known, and in an embodiment of this Specification, it is intended that these modules perform their known functions. Management controller 354 may be provided with the particular function of providing a communications interface to BMC 160.

BMC 160 also includes a number of logical blocks. For example, BMC 160 may include a media server 318, a peripheral server 322, a serial server 324, a serial proxy 326, and an IPMI server 390. In an example, the logical blocks of BMC 160 may be provided for performing out-of-band management and configuring interfaces to a plurality of clients. For example, graphics controller 316 may configure a graphics device for use with KVM client 382. Similarly, media server 318 may be operable for configuring services for media client 380. IPMI server 390 may provision services for IPMI client 386.

In addition to the logical blocks disclosed above, BMC 160 may include a super I/O interface 314 for communicating with bootstrap OS 136 and BIOS 334, and a processor 320. Processor 320 may include any combination of hardware, software, or firmware providing programmable logic, including by way of non-limiting example a microprocessor, DSP, FPGA, PLA, ASIC, or virtual machine processor.

In an embodiment, a front panel 350 may be provided as an interactive interface for an end-user to view the status of BMC 160 and to perform limited control functions. Sensors and component interface 340 may also be provided so that BMC 160 may interface with sensors and other components.

It should be noted that FIG. 3 includes a number of logical blocks and elements, each of which is provided by way of nonlimiting example only. Each of the logical blocks of FIG. 3 may include, as appropriate, any combination of hardware, software, and/or firmware necessary to implement its function. Thus, it should be recognized that certain hardware, software, and firmware elements may be shared between various logical blocks, and the logical blocks may be understood to provide a division of function more than a strict division of substance. Those with skill in the art will recognize that there are many additional ways to implement the devices shown in FIG. 3.

Figure 4:
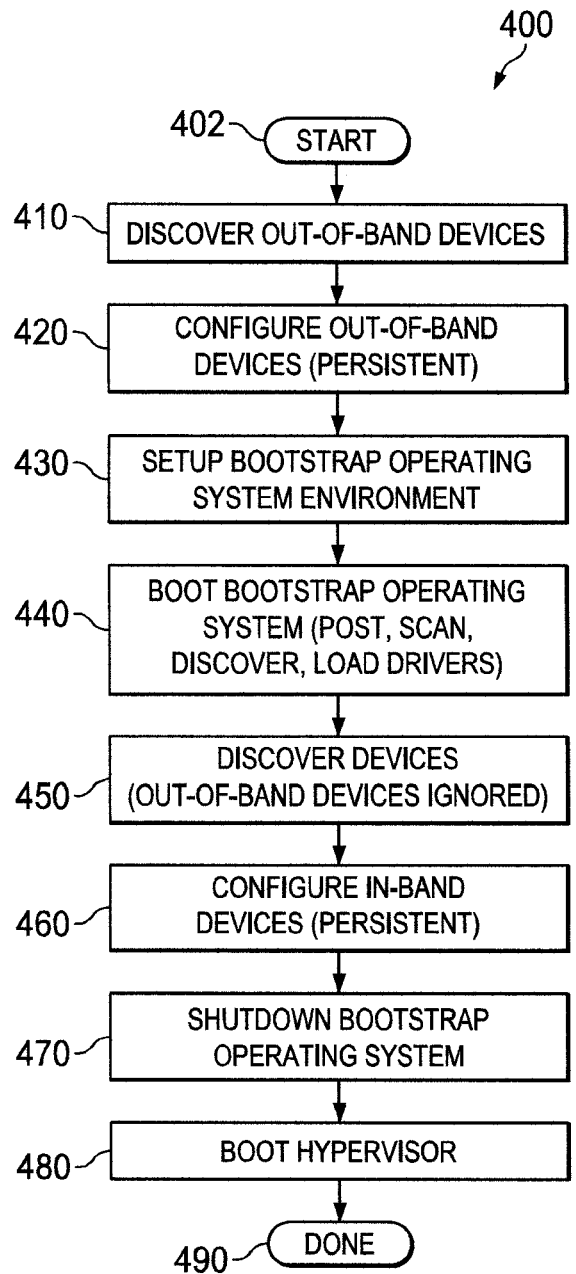
FIG. 4 is a flow chart of a method according to one or more examples of the present Specification.

FIG. 4 is a block diagram of an example method 400 of performing discovery and configuration of a server 110 according to one or more examples of the present Specification. Method 400 starts in block 402. In block 410, UCSM 142 discovers out-of-band devices and resources on one or more servers 110. As described in this Specification, out-of-band devices include devices that are configurable by a BMC 160, or that are otherwise UCS-aware. Discovery of out-of-band devices is accomplished without needing to boot OS 130 or bootstrap OS 136.

In block 420, UCSM 142 configures out-of-band devices. In some examples, this configuration is persistent, and may be stored for example on an internal flash memory for out-of-band devices. Thus, powering off server 110 and/or rebooting server 110 does not affect configuration of out-of-band devices.

In block 430, UCSM 142 sets up bootstrap OS 136. This may be accomplished, for example, by sending an appropriate signal to full-slot server 110 instructing server 110 to perform any actions necessary to prepare bootstrap OS 136 for operation. In block 440, server 110 boots bootstrap OS 136. Booting bootstrap OS 136 may include a number of steps. For example, in one embodiment, bootstrap OS 136 performs a full power-on self-test (POST). The POST may include, for example, checking each individual cell of memory 120. It may also include performing other self-test features, and scanning hardware. In some examples, each core of processor 102 performs one or more self-test functions.

After the POST is complete, server 110 discovers all attached devices. Discovery of devices includes both out-of-band devices and in-band devices. In some embodiments, discovery of devices may also include performing self-testing of devices or otherwise scanning the devices.

Once the devices are properly discovered, bootstrap OS 136 loads appropriate drivers for each device. This may include for example loading kernel modules that are configured to handle each device. It will be recognized that in some cases, performing step 440 may take a substantial time. In one example, step 440 may take approximately ten minutes or more. For some users and clients waiting for resources to be allocated, this delay may be unacceptable. In certain embodiments, the POST is the most time-consuming single element of block 440. This is particularly true where server 110 includes a large amount of memory 120. In some cases, server 110 may include up to several terabytes of memory. Performing a POST of each cell of several terabytes of memory, as well as multiple cores of each of several processors 102, may be very time-consuming.

In block 450, bootstrap OS 136 discovers all devices attached to server 110. Notably, discovery of devices attached to server 110 includes discovery of both in-band devices and out-of-band devices. However, in certain cases, out-of-band devices may be ignored in step 450, because those out-of-band devices were discovered and configured persistently in block 420. Thus, out-of-band devices may be ignored in block 450.

In block 460, bootstrap OS 136 configures discovered in-band devices. As with the configuration of out-of-band devices, configuration of in-band devices in block 460 may be persistent.

In block 470, once discovery of all in-band devices is complete, and those in-band devices have been properly and persistently configured, server 110 may shut down bootstrap OS 136.

In block 480, devices are properly detected, persistently configured, and allocated. Thus, server 110 is prepared to boot to a hypervisor environment for operation by a user. It should be recognized that a hypervisor environment is disclosed as only one example of a possible configuration of server 110, and that many other configurations, such as a virtual machine, or native OS are possible for booting server 110.

In block 490, method 400 is complete.

Figure 5:
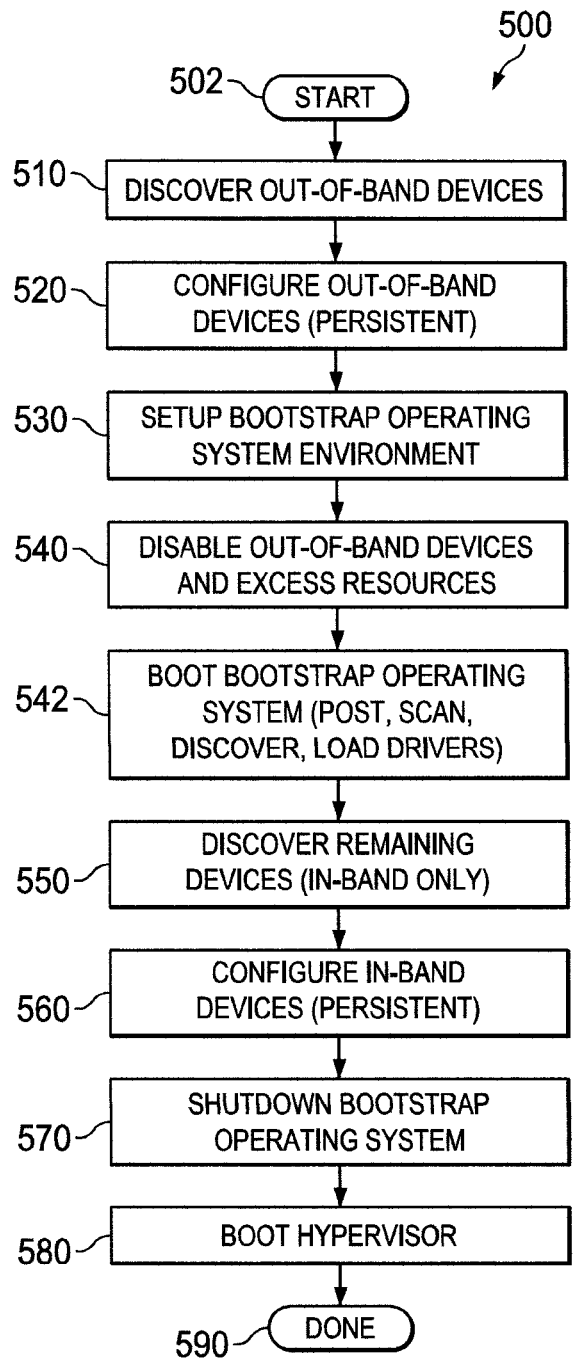
FIG. 5 is a flow chart of a method according to one or more examples of the present Specification.

FIG. 5 is a flow diagram of a method 500 of configuring allocating resources according to one or more examples of the present Specification. Method 500 starts in block 502. In block 510, UCSM 142 discovers out-of-band devices and resources on one or more servers 110. As described in this Specification, out-of-band devices include devices that are configurable by a BMC 160, or that are otherwise UCS-aware. Discovery of out-of-band devices is accomplished without needing to boot OS 130 or bootstrap OS 136.

In block 520, UCSM 142 configures out-of-band devices. In some examples, this configuration is persistent, and may be stored for example on an internal flash memory for out-of-band devices. Thus, powering off server 110 and/or rebooting server 110 does not affect configuration of out-of-band devices.

In block 530, UCSM 142 sets up bootstrap OS 136. This may be accomplished, for example, by sending an appropriate signal to full-slot server 110 instructing server 110 to perform any actions necessary to prepare bootstrap OS 136 for operation.

In block 540, bootstrap OS 136 may disable out-of-band devices and excess resources. Disabling out-of-band devices may include powering them down, or simply allocating a table that indicates that the devices are not to be detected or configured in the following steps. In one example, disabling excess resources includes disabling all but one core of each processor 102. Disabling excess resources may also include disabling all but one memory bank of memory 120 for each processor 102. This provides a minimal amount of processing power and memory during the boot process. Although this processing power and memory may be substantially reduced from the total available within server 110, the trade-off may be acceptable inasmuch as bootstrap OS 136 is not configured to perform heavy processing loads, but rather to only configure in-band devices, and otherwise prepare server 110 for operation by an end user.

In block 542, server 110 boots bootstrap OS 136. As with block 440 of FIG. 4, booting bootstrap OS 136 may involve a POST. However, instead of several terabytes of memory, this process may include a self-test of only a few gigabytes, or in some examples only a few hundred megabytes of memory. Furthermore, rather than involving multiple cores of multiple processors, the POST of block 542 involves only one core of several processors in an example embodiment. As noted above, the POST of block 440 of FIG. 4 may be the most time-consuming aspect of booting bootstrap OS 136. Thus, by disabling excess resources that are not necessary or desirable for carrying out the function of bootstrap OS 136, block 542 of FIG. 5 may substantially reduce the time to complete the booting of bootstrap OS 136. As with block 440 of FIG. 4, block 542 discovers available devices and loads drivers for those devices. However, in one embodiment, rather than scanning, discovering, and loading drivers for all attached devices to server 110, the scanning, discovering, and loading of block 542 involves only scanning, discovering, and loading drivers for in-band devices that were not disabled in block 540.

Thus, in block 550, discovery of devices involves discovering only remaining devices, which in an example includes only in-band devices and other devices minimally necessary to boot bootstrap OS 136.

In block 560, server 110 configures in-band devices. As with block 460 of FIG. 4, this configuration is persistent, so that when bootstrap OS 136 is shut down, and server 110 is powered down or restarted, the configuration is not lost.

In block 570, configuration and preparation is complete, so that bootstrap OS 136 may be shut down.

In block 580, server 110 is properly prepared and provisioned, and a hypervisor is booted. As before, a hypervisor is disclosed as only one example of a possible operating configuration for server 110.

In block 590, method 500 is done.

Throughout this Specification, certain features of the disclosure may be described in terms of modules, functions, or other logical blocks. It should be noted that according to modern computer architecture practices, these logical blocks may include any combination of hardware, software, firmware, or similar. For example, any computing device disclosed herein may include a processor, a memory, and one or more interconnect interfaces. In many cases, however, a processor may be provided as part of a virtual machine architecture or other emulation or virtualization environment, in which a physical processor provides a virtual processor via software. Similarly, "memory" need not refer to a single monolithic memory element or structure. Rather, "memory" may include, by way of non-limiting example, on-chip cache, L1 memory, L2 memory, cache memory, main memory, paging files, or virtual memory. Furthermore, a memory structure such as a main memory may be subdivided into one or more memory banks, which may be interleaved or otherwise arranged.

Logical blocks also need not be physically separate devices. For example, in some cases, a "memory" and a "storage" will be shown as separate logical blocks, but those with skill in the art will easily recognize that in some architectures, a single physical memory block may serve as both a main memory and a storage region. Similarly, a network interface and a peripheral interface may be disclosed as separate logical blocks, but in many cases, a network protocol such as a virtual terminal or hypervisor is provided so that peripherals and user interface elements are accessed via a network such as an internet protocol (IP) network.

Thus, at a high level, it should be appreciated that the logical blocks disclosed herein represent functions that may be carried out by some combination of hardware, software, and/or firmware, while the various interfaces disclosed represent any communication medium, including appropriate hardware and software protocols, internal or external, that may be used to communicatively couple those logical elements to one another.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Certain embodiments, including for example BMC 160, may readily include a system on chip (SOC) central processing unit (CPU) package. An SOC represents an integrated circuit (IC) that integrates components of a computer or other electronic system into a single chip. It may contain digital, analog, mixed-signal, and other functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc. Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), (FPGA), (EPROM), (EEPROM), etc., software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various OSs or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the buffers, graphics elements, interconnect boards, clocks, DDRs, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the Specification, to limit this disclosure in any way that is not otherwise reflected in the appended claims.

What is claimed is:

1. A management controller configured for provisioning of resources comprising:
   a processor;
   a network interface operable to communicatively couple the processor to a baseboard management controller (BMC) resident on a server; and
   a memory communicatively coupled to the processor and operable to instruct the processor for provisioning, comprising:
   communicating with the BMC to identify an out-of-band resource available on the server in a low-power state;
   determining a minimally sufficient hardware configuration with a minimal amount of processing power and memory to persistently configure an in-band resource, wherein the in-band resource is determined not to be configurable by the resident BMC via a discovery process;
   disabling the out-of-band resource and at least one additional resource on the server based on the minimally sufficient hardware configuration;
   booting the server to an OS in a higher-power state;
   communicating with the OS to identify the in-band resource on the server;
   and
   communicating with the OS to persistently configure the in-band resource.

2. The management controller of claim 1, wherein disabling at least one additional resource comprises disabling at least one processor core.

3. The management controller of claim 1, wherein disabling at least one additional resource comprises disabling all but one core of each of a plurality of processors.

4. The management controller of claim 1, wherein the OS is a bootstrap OS.

5. The management controller of claim 4, wherein disabling at least one additional resource comprises disabling all out-of-band resources not included in the minimally-sufficient hardware configuration.

6. The management controller of claim 1, further comprising:
   a management system coupled to a plurality of client servers, wherein the management system is configured to provision the plurality of client servers.

7. One or more non-transient computer-readable mediums having stored thereon instructions operable to instruct a processor for provisioning, comprising:
   communicating with a baseboard management controller (BMC) to identify an out-of-band resource available on a server in a low-power state;
   determining a minimally sufficient hardware configuration with a minimal amount of processing power and memory to persistently configure an in-band resource, wherein the in-band resource is determined not to be configurable by the resident BMC via a discovery process;
   disabling the out-of-band resource and at least one additional resource on the server based on the minimally sufficient hardware configuration;
   booting the server to an OS in a higher-power state;
   communicating with the OS to identify the in-band resource on the server; and
   communicating with the OS to persistently configure the in-band resource.

8. The one or more non-transient computer-readable mediums of claim 7, wherein disabling at least at least one additional resource comprises disabling at least one processor core.

9. The one or more non-transient computer-readable mediums of claim 7, wherein disabling at least one additional resource comprises disabling all but one core of each of a plurality of processors.

10. The one or more non-transient computer-readable mediums of claim 7, wherein the OS is a bootstrap OS.

11. The one or more non-transient computer-readable mediums of claim 10, wherein disabling at least one additional resource comprises disabling all out-of-band resources not necessary to operate the bootstrap OS.

12. A method of provisioning resources performed by a computing device comprising:
    communicating with a baseboard management controller (BMC) to identify an out-of-band resource available on a server in a low-power state;
    determining a minimally sufficient hardware configuration with a minimal amount of processing power and memory to persistently configure an in-band resource, wherein the in-band resource is determined not to be configurable by the resident BMC via a discovery process;
    disabling the out-of-band resource and at least one additional resource on the server based on the minimally sufficient hardware configuration;
    booting the server to an OS in a higher-power state;
    communicating with the OS to identify the in-band resource on the server; and
    communicating with the OS to persistently configure the in-band resource.

13. The method of claim 12, wherein disabling at least at least one additional resource comprises disabling at least one processor core.

14. The method of claim 12, wherein disabling at least one additional resource comprises disabling all but one core of each of a plurality of processors.

15. The method of claim 12, wherein the OS is a bootstrap OS.

16. The method of claim 15, wherein disabling at least one additional resource comprises disabling all out-of-band resources not necessary to operate the bootstrap OS.

17. The method of claim 12, further comprising:
    performing at least one memory blacklisting process to disable a plurality of memory devices per a central processing unit (CPU).

18. The management controller of claim 4, wherein disabling at least one additional resource comprises disabling all resources not necessary to operate the bootstrap OS.

19. The one or more non-transient computer-readable mediums of claim 7, wherein the instructions are further to instruct the processor to reboot the server into an operational operating system.

20. The method of claim 12, further comprising rebooting the server into an operational operating system.

* * * * *